United States Patent [19]

Sherman

[11] Patent Number: 4,739,209

[45] Date of Patent: Apr. 19, 1988

[54] STARTER-GENERATOR BRUSH

[75] Inventor: Seymour Sherman, Dix Hills, N.Y.

[73] Assignee: Aircraft Parts Corp., Farmingdale, N.Y.

[21] Appl. No.: 915,976

[22] Filed: Oct. 6, 1986

[51] Int. Cl.⁴ .............................................. H02K 13/00

[52] U.S. Cl. ...................................... 310/249; 310/71; 310/251; 310/253

[58] Field of Search ............... 310/239, 240, 242, 245, 310/246, 247, 71, 248, 251, 249, 252, 253; 29/826, 861

[56] References Cited

U.S. PATENT DOCUMENTS

| | | | |
|---|---|---|---|
| 1,785,483 | 12/1930 | Hansen | 310/249 |
| 1,979,696 | 11/1934 | Lynn | 310/249 |
| 2,507,780 | 5/1950 | Gilbert | 310/249 |
| 2,509,021 | 5/1950 | Settle | 310/249 |
| 2,918,591 | 12/1959 | Lyddon | 310/248 |
| 2,927,230 | 3/1960 | Guarnier | 310/249 |
| 3,445,704 | 5/1969 | Rokaw | 310/246 |
| 4,338,583 | 7/1982 | Major | 310/242 |

FOREIGN PATENT DOCUMENTS

| | | | |
|---|---|---|---|
| 0621261 | 10/1935 | Fed. Rep. of Germany | 310/261 |
| 0867569 | 2/1953 | Fed. Rep. of Germany | 310/249 |
| 0897733 | 11/1953 | Fed. Rep. of Germany | 310/248 |
| 1007566 | 5/1972 | France | 310/248 |

*Primary Examiner*—R. Skudy
*Attorney, Agent, or Firm*—Daniel Jay Tick

[57] ABSTRACT

A starter-generator brush has first and second juxtaposed carbon wafers. A first copper plate is provided on a recessed back surface of the first carbon wafer. A first electrically conductive hammer place has a first copper back plate on a recessed back surface of the second carbon wafer and a first top plate extending from the first back plate at an acute angle therewith. First and second solid copper rivets extend through the first copper plate and first and second side holes of the first carbon wafer and affix the first copper plate to the first wafer with the first copper plate in juxtaposition with the back surface of the first wafer. Brush pigtails are accommodated in first and second top holes of the first wafer and have a first end in electrical contact with the first and second solid copper rivets. Third and fourth solid copper rivets extend through the first back plate and the first and second side holes of the second carbon wafer and affix the first back plate to the second wafer with the first back plate in juxtaposition with the back surface of the second wafer and the first top plate juxtaposed with the top surface of each of the first and second wafers. Additional brush pigtails are accommodated in first and second top holes of the second wafer and have a first end in electrical contact with the third and fourth solid copper rivets, respectively. A first copper terminal is provided at the spaced opposite free second ends of the brush pigtails and additional brush pigtails for conducting maximum current from the brush. The pigtails and additional pigtails are silver soldered in the first copper terminal.

23 Claims, 4 Drawing Sheets

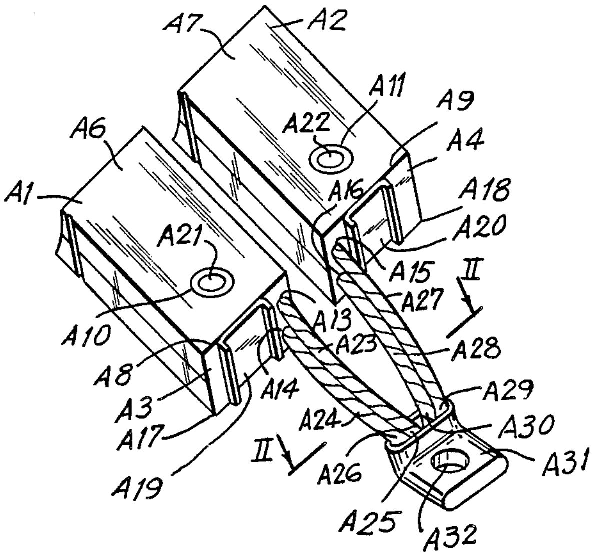
F/G. 1
PRIOR ART
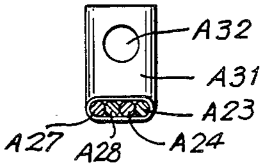
F/G. 2
PRIOR ART

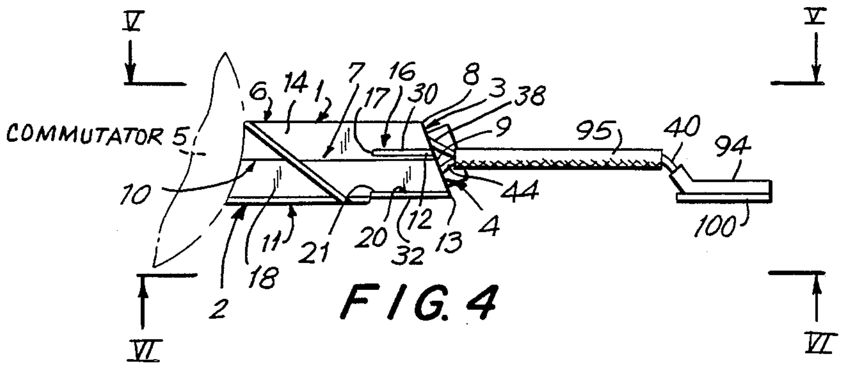
FIG. 4
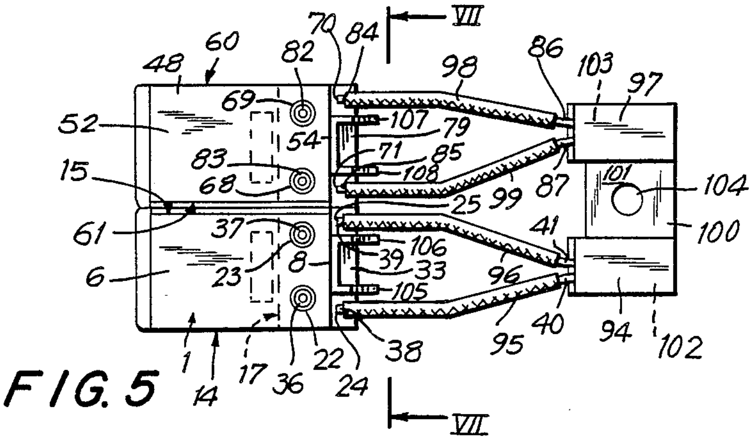
FIG. 5
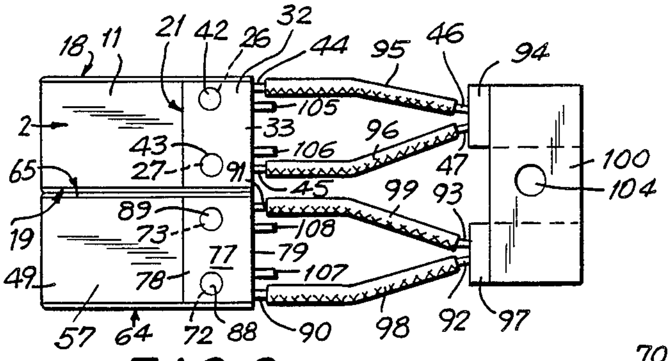
FIG. 6
FIG. 7
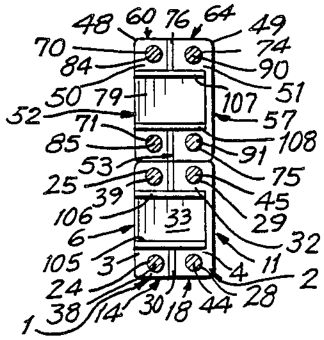

STARTER-GENERATOR BRUSH

BACKGROUND OF THE INVENTION

The present invention relates to a brush. More particularly, the invention relates to a brush for a starter generator, and especially for an aircraft starter generator.

Aircraft turbine engines require a starter much the same as a car, except that the turbine is free wheeling devices. Thus, a motor could act as a starter. To save weight, aircraft manufacturers utilize a DC generator as a starting device by motorizing the generator. Aircraft starter-generators are designed in sizes of 150, 250, 300 and 400 amperes and are designed to carry very small overloads in order to keep their weight to a minimum. In the starting mode, a 300 ampere generator will draw 1700 to 2000 amperes of current, thus overloading the starter-generator by a large amount of current. In one to two seconds, the 1700 to 2000 ampere current draw will reduce to 800 to 1200 amperes. This can last for an additional one to two seconds, tapering down 800 amperes for an additional six to eight seconds. Brush temperatures can exceed 800 to 1000 degrees F in three to four seconds. The duty cycle of the starter-generator in the starter mode is about 30 seconds. The short duty cycle allows the starter to exist without burning up.

The weakest link in the design of a starter-generator is the brushes. The carbon brushes utilized in starter-generators wear rapidly when brush temperatures exceed 450 degrees F. Therefore, the life of the starter-generator is governed by the life of the brushes. For the past 25 years there have been no major brush design movements in aircraft starter-generators, to increase brush life. With the development of higher horsepower turbine engines the 300 to 400 ampere starter-generators utilized to start such engines have been experiencing rapid brush wear. Burning brush boxes and brush heat cause the carbon to turn red and then white, as the heat increases.

Inspection and testing of known brushes have uncovered various deficiencies in various parts of the brush. The present brushes use a single brush shunt. While sufficient in size to carry generating loads, it is deficient in its capability of carrying starting loads. The presently used brush terminal acts as a resistance point to current flow along with the single brush shunt. The brush cannot dissipate the heat created, due to the high resistances in the shunt and terminal, causing annealing of the commutator bars and their subsequent movement, which destroys the brush.

The principal object of the invention is to provide a starter-generator brush having increased strength, reduced operating temperatures and increased current flow with minimal heat.

An object of the invention is to provide a starter-generator brush having great brush strength, sufficient to prevent carbon breakage at speeds greater than 14,000 RPM.

Another object of the invention is to provide a starter-generator brush having a twin shunt and a hammer plate which strengthens the brush sufficiently to prevent carbon breakage at speeds greater than 14,000 RPM.

Still another object of the invention is to provide a starter-generator brush having reduced operating temperatures.

Yet another object of the invention is to provide a starter-generator brush having operating temperatures reduced by 40% relative to single shunt brushes.

Another object of the invention is to provide a starter-generator brush having copper plates which heat sink the carbon wafers and reduce brush operating temperatures.

Still another object of the invention is to provide a starter-generator brush having a hammer plate on one wafer of each pair of carbon wafers which reduces the brush operating temperatures.

Yet another object of the invention is to provide a starter-generator brush having copper plates on the wafers of each pair of carbon wafers which increase the current flow with reduced heat.

Another object of the invention is to provide a starter-generator brush which transmits over 40% more current than known brushes.

Still another object of the invention is to provide a starter-generator brush which is able to transmit up to 2000 amperes with minimal heat.

Yet another object of the invention is to provide a starter-generator brush having a shunt connection which is able to transmit up to 2000 amperes with minimal heat.

Another object of the invention is to provide a starter-generator brush having a terminal which is capable of carrying 2000 amperes with minimal heat.

BRIEF SUMMARY OF THE INVENTION

To alleviate the problem of deficiency in carrying starting loads, the addition of another shunt was found to be desirable. In order to install another shunt, the single shunt termination point had to be moved from the center of the brush to the sides of the brush. It was known that this would weaken the termination point, since there was not enough carbon on the side of the brush to support the rivet. This would be more of a problem due to vibration, since turbine starter-generators rotate at 12,000 RPM, in lieu of older piston engine generators which rotate at 3000 to 8000 RPM. At 12,000 RPM, imperfections in commutator surface and armature balance becomes critical to brush life. Therefore, moving the rivets to the outer edges of the narrow brush could create premature brush failures due to carbon breakage. The brush was stengthened by mounting a hammer plate on one of each pair of shunt brush wafers. The rectangular hammer plate increased the brush strength sufficiently to prevent carbon breakage at speeds greater than 14,000 RPM. The brush operating temperatures were reduced 40% relative to single shunt brushes. When a copper plate was added to the front brush wafer of the pair of brush wafers, the operating temperatures of brush wafer were similarly reduced 40%.

I investigated how the known brushes have their shunts connected to the carbons and how the current is conducted. At the top center of the brush, the carbon is recessed to create a cavity. In this cavity, a rivet hole and rivet is installed in order to tie the brush shunts around the rivet. After the wire is wrapped around the rivet, the washer is placed on top of the rivet and wire and the assembly is silver soldered. In this known design, the rivet is a thin wall tubular rivet which has a head at one end. Thus, a thin wall rivet is used to conduct a large current, which it obviously cannot. The conduction of current is transferred to the shunts by this tubular rivet and any place the shunts may be soldered to the carbon cavity.

In the brush of the invention, rectangular copper plates are soldered and riveted to the back of the brushes. There are two rivet holes in each brush wafer. Each hole is located on the outer edge of each brush wafer. Two solid rivets with hollow tails are used in each wafer. The heads of the solid rivet are fastened to the rectangular copper plate and passed through the hole. The wires are wrapped around the solid rivet, a washer is placed on top, and the rivet is rolled over to fasten the washer and wire together. Current from the carbon brush is also gathered by the rectangular copper plates on the backs of the brushes. The copper plates are soldered to the brushes. Thus, the copper plate can transmit a larger amount of current through the solid rivet to the shunts; and from the places the shunts are soldered to the carbon. Over 50% more current can be trransmitted via the plate and solid rivet than by the tubular rivet alone. Thus, besides the plates and solid rivet heat sinking the brushes, they also become less of a resistance point than before, thereby reducing the heat generated at the rivet.

The combined effect of twin leads per brush, rectangular copper plates and solid rivets, results in 40% less heat. The current carrying capacity of the brush is increased by almost 40%.

The known brush terminals do not have a sufficient volume of copper to carry the electrical load. The design of this terminal does not have sufficient silver solder or metal width around the terminal screw hole to conduct the electrical load.

The twin lead brush set of the invention has an improved terminal which results in a 40% drop in brush heat.

In accordance with the invention, a dynamoelectric machine has a rotatable commutator (not shown in the drawings) and a brush contacting the commutator. The brush comprises first and second substantially juxtaposed carbon wafers each has a top surface spaced from the commutator. A front surface meets the top surface at a front edge thereof. A back surface meets the top surface at a spaced opposite rear edge thereof. A pair of spaced opposite side surfaces join corresponding side edges of the front and back surfaces. Each of the first and second wafers has first and second spaced substantially parallel side holes formed therethrough and opening on the front and back surfaces and first and second spaced substantially parallel top holes formed in the wafer and opening on the top surface and extending to the first and second side holes, respectively of the respective wafer. The top holes accommodate brush pigtails. A first copper plate is on the back surface of the first carbon wafer. The first copper plate has a pair of spaced holes formed therethrough. A first electrically conductive hammer plate has a first copper back plate on the back surface of the second carbon wafer and a first top plate extending from the first back plate at an acute angle therewith. The first back plate has a first pair of spaced holes formed therethrough. First and second electrically conductive members extend through the first pair of spaced holes of the first copper plate and the first and second side holes of the first carbon wafer and affix the first copper plate to the first wafer with the first copper plate substantially in juxtaposition with the back surface of the first wafer. Brush pigtails are accommodated in the first and second top holes of the first wafer and have a first end in electrical contact with the first and second electrically conductive members, respectively, and a spaced opposite free second end. Third and fourth electrically conductive members extend through the first pair of spaced holes of the first back plate and the first and second side holes of the second carbon wafer and affix the first back plate to the second wafer with the first back plate substantially in juxtaposition with the back surface of the second wafer and the first top plate substantially juxtaposed with the top surface of each of the first and second wafers. Additional brush pigtails are accommodated in the first and second top holes of the second wafer and have a first end in electrical contact with the third and fourth electrically conductive members, respectively, and a spaced opposite free second end.

The brush further comprises third and fourth substantially juxtaposed carbon wafers, each having a top surface spaced from the commutator. A front surface meets the top surface at a front edge thereof. A back surface meets the top surface at a spaced opposite rear edge thereof. A pair of spaced opposite side surfaces join corresponding side edges of the front and back surfaces. Each of the third and fourth wafers has first and second spaced substantially parallel side holes formed therethrough and opening on the front and back surfaces and first and second spaced substantially parallel top holes formed in the wafer and opening on the top surface and extending to the first and second side holes, respectively of the respective third and fourth wafer. The top holes accommodate brush pigtails. A second copper plate is on the back surface of the third carbon wafer. The second copper plate has a second pair of spaced holes formed therethrough. A second electrically conductive hammer plate has a second copper back plate on the back surface of the fourth carbon wafer and a second top plate extending from the second back plate at an acute angle therewith. The second back plate has a second pair of spaced holes formed therethrough. Fifth and sixth electrically conductive members extend through the second pair of spaced holes of the second copper plate and the first and second side holes of the third carbon wafer and affix the second copper plate to the third wafer with the second copper plate substantially in juxtaposition with the back surface of the third wafer. Brush pigtails are accommodated in the first and second top holes of the third wafer and have a first end in electrical contact with the fifth and sixth electrically conductive members, respectively, and a spaced opposite free second end. Seventh and eighth electrically conductive members extending through the second pair of spaced holes in the second back plate and the first and second side holes of the fourth carbon wafer and affix the second back plate to the fourth wafer with the second back plate substantially in juxtaposition with the back surface of the fourth wafer and the second top plate substantially juxtaposed with the top surface of each of the third and fourth wafers. Additional brush pigtails are accommodated in the first and second top holes of the fourth wafer and have a first end in electrical contact with the seventh and eighth conductive members, respectively, and a spaced opposite free second end.

In accordance with the invention, a starter-generator has a rotatable commutator and a brush contacting the commutator. The brush comprises first and second substantially juxtaposed carbon wafers each having a top surface spaced from the commutator. A front surface meets the top surface at a first edge thereof. A back surface meets the top surface at a spaced opposite rear edge thereof. A pair of spaced opposite side surfaces join corresponding side edges of the front and back surfaces. The back surface of each of the first and second wafers has a recessed surface extending between the side surfaces and the top surface and a line spaced from and substantially parallel to the rear edge. Each of the first and second wafers has first and second spaced substantially parallel side holes formed therethrough and opening on the front and back surfaces and first and second spaced substantially parallel top holes formed in the wafer and opening on the top surface and extending to the first and second side holes, respectively of the respective wafer. The top holes accommodate brush pigtails. A first copper plate is on the recessed surface of the first carbon wafer. The first copper plate has a first pair of spaced holes formed therethrough. A first electrically conductive hammer plate has a first copper back plate on the recessed surface of the second carbon wafer and a first top plate extending from the first back plate at an acute angle therewith. The first back plate has a first pair of spaced holes formed therethrough. First and second electrically conductive members extend through the first pair of spaced holes of the first copper plate and the first and second side holes of the first carbon wafer and affix the first copper plate to the first wafer with the first copper plate substantially in juxtaposition with the back surface of the first wafer. Brush pigtails are accommodated in the first and second top holes of the first wafer and have a first end in electrical contact with the first and second electrically conductive members, respectively, and a spaced opposite free second end. Third and fourth electrically conductive members extend through the first pair of spaced holes of the first back plate and the first and second side holes of the second carbon wafer and affix the first back plate to the second wafer with the first back plate substantially in juxtaposition with the back surface of the second wafer and the first top plate substantially juxtaposed with the top surface of each of the first and second wafers. Additional brush pigtails are accommodated in the first and second top holes of the second wafer and have a first end in electrical contact with the first and second electrically conductive members, respectively, and a spaced opposite free second end.

A first copper terminal is provided at the second ends of the brush pigtails. Additional brush pigtails are provided for conducting maximum current from the brush. The first copper terminal accommodates the brush pigtails and additional brush pigtails. The brush pigtails and additional brush pigtails are silver soldered in the first terminal.

The first top plate of the first electrically conductive hammer plate has a pair of flanges extending at substantially right angles thereto at spaced opposite side edges thereof.

Each of the first, second, third and fourth electrically conductive members comprises a solid copper rivet.

The brush further comprises insulative means for electrically insulating the brush pigtails extending from the top holes of the first wafer and the additional brush pigtails extending from the top holes of the second wafer to the first copper terminal.

The brush further comprises third and fourth substantially juxtaposed carbon wafers, each having a top surface spaced from the commutator. A front surface meets the top surface at a front edge thereof. A back surface meets the top surface at a spaced opposite rear edge thereof. A pair of spaced opposite side surfaces joint corresponding side edges of the front and back surfaces. The back surface of each of the third and fourth wafers has a recessed surface extending between the side surfaces and the top surface and a line spaced from and substantially parallel to the rear edge. Each of the third and fourth wafers has first and second spaced substantially parallel side holes formed therethrough and opening on the front and back surfaces and first and second spaced substantially parallel top holes formed in the wafer and opening on the top surface and extending to the first and second side holes, respectively of the respective third and fourth wafer. The top holes accommodate brush pigtails. A second copper plate has a second pair of spaced holes formed therethrough. A second electrically conductive hammer plate has a second copper back plate on the recessed surface of the fourth carbon wafer and a second top plate extending from the second back plate at an acute angle therewith. The second back plate has a second pair of spaced holes formed therethrough. Fifth and sixth electrically conductive members extend through the holes of the second copper plate and the first and second side holes of the third carbon wafer and affix the second copper plate to the third wafer with the second copper plate substantially in juxtaposition with the back surface of the third wafer. Brush pigtails are accommodated in the first and second top holes of the third wafer and have a first end in electrical contact with the fifth and sixth electrically conductive members, respectfully, and a spaced opposite free second end. Seventh and eighth electrically conductive members extend through the holes in the second back plate and the first and second side holes of the fourth carbon wafer and affix the second back plate to the fourth wafer with the second back plate substantially in juxtaposition with the back surface of the fourth wafer and the second top plate substantially juxtaposed with the top surface of each of the third and fourth wafers. Additional brush pigtails are accommodated in the first and second top holes of the fourth wafer and have a first end in electrical contact with the seventh and eighth conductive members, respectively, and a spaced opposite free second end.

A second copper terminal is provided at the second ends of the brush pigtails. Additional brush pigtails are provided for conducting maximum current from the brush. The second copper terminal accommodates the brush pigtails and additional brush pigtails. The brush pigtails and additional brush pigtails are silver soldered in the second copper terminal.

The second top plate of the second hammer plate has a pair of flanges extending at substantially right angles thereto at spaced opposite side edges thereof.

Each of the fifth, sixth, seventh and eighth electrically conductive members comprises a solid copper rivet.

The brush further comprises insulative means for electrically insulating the brush pigtails extending from the top holes of the third wafer and the additional bush pigtails extending from the top holes of the fourth wafer to the second copper terminal.

A heavy copper plate has a surface with spaced opposite first and second sides and a hole formed therethrough substantially equidistantly between the first and second sides. The first and second copper terminals are silver soldered to the surface of the plate at corresponding sides thereof in spaced relation with each other.

In accordance with the invention, a starter-generator has a rotatable commutator and a brush contacting the commutator. The brush comprises first and second substantially juxtaposed carbon wafers each having a top surface spaced from the commutator. A front surface meets the top surface at a front edge thereof. A back surface meets the top surface at a spaced opposite rear edge thereof. A pair of spaced opposite side surfaces join corresponding side edges of the front and back surfaces. The back surface of each of the first and second wafers has a recessed surface extending between the side surfaces and the top surface and a line spaced from and substantially parallel to the rear edge. Each of the first and second wafers has first and second spaced substantially parallel side holes formed therethrough and opening on the front and back surfaces and first and second spaced substantiallly top holes formed in the wafer and opening on said top surface and extending to the first and second side holes, respectively of the respective wafer. The top holes accommodate brush pigtails. A first copper plate is on the recessed surface of the first carbon wafer. The first copper plate has a first pair of spaced holes formed therethrough. A first electrically conductive hammer plate has a first copper back plate on the recessed surface of the second carbon wafer and a first top plate extending from the first back plate at an acute angle therewith. The first back plate has a first pair of spaced holes formed therethrough. First and second electrically conductive members extend through the first pair of spaced holes of the first copper plate and the first and second side holes of the first carbon wafer and affix the first copper plate to the first wafer with the first copper plate substantially in juxtaposition with the back surface of the first wafer. Brush pigtails are accommodated in the first and second top holes of the first wafer and have a first end in electrical contact with the first and second electrically conductive members, respectively, and a spaced opposite free second end. Third and fourth electrically conductive members extend through the first pair of spaced holes of the first back plate and the first and second side holes of the second carbon wafer and affix the first back plate to the second wafer with the first back plate substantially in juxtaposition with the back surface of the second wafer and the first top plate substantially juxtaposed with the top surface of each of the first and second wafers. Additional brush pigtails are accommodated in the first and second top holes of the second wafer and have a first end in electrical contact with the first and second electrically conductive members, respectfully, and a spaced opposite free second end. A first copper terminal is provided at the second ends of the brush pigtails and additional brush pigtails for conducting maximum current from the brush. The first copper terminal accommodates the brush pigtails and additional brush pigtails. The brush pigtails and additional brush pigtails are silver soldered in the first copper terminal. Third and fourth substantially juxtaposed carbon wafers are provided, each having a top surface spaced from the commutator. A front surface meets the top surface at a front edge thereof. A back surface meets the top surface at a spaced opposite rear edge thereof. A pair of spaced opposite side surfaces join corresponding side edges of the front and back surfaces. The back surface of each of the third and fourth wafers has a recessed surface extending between the side surfaces and the top surface and a line spaced from and substantially parallel to the rear edge. Each of the third and fourth wafers has first and second spaced substantially parallel side holes formed therethrough and opening on the front and back surfaces and first and second substantially parallel top holes formed in the wafer and opening on the top surface and extending to the first and second side holes, respectively. The top holes accommodate brush pigtails. A second copper plate is provided on the recessed surface of the third carbon wafer. The second copper plate has a second pair of spaced holes formed therethrough. A second electrically conductive hammer plate has a second copper back plate on the recessed surface of the fourth carbon wafer and a second top plate extending from the second back plate at an acute angle therewith. The second back plate has a second pair of spaced holes formed therethrough. Fifth and sixth electrically conductive members extend through the second pair of spaced holes of the second copper plate and the first and second side holes of the third carbon wafer and affix the second copper plate to the third wafer with the second copper plate substantially in juxtaposition with the back surface of the third wafer. Brush pigtails are accommodated in the first and second top holes of the third wafer and have a first end in electrical contact with the fifth and sixth electrically conductive members, respectively, and a spaced opposite free second end. Seventh and eighth electrically conductive members extend through the second pair of spaced holes in the second back plate and the first and second side holes of the fourth carbon wafer and affix the second back plate to the fourth wafer with the second back plate substantially in juxtaposition with the back surface of the fourth wafer and the second top plate substantially juxtaposed with the top surface of each of the third and fourth wafers. Additional brush pigtails are accommodated in the first and second top holes of the fourth wafer and have a first end in electrical contact with the seventh and eighth conductive members, respectively, and a spaced opposite free second end. A second copper terminal is provided at the second ends of the brush pigtails and additional brush pigtails for conducting maximum current from the brush. The second copper terminal accommodates the brush pigtails and additional brush pigtails. The brush pigtails and additional brush pigtails are silver soldered in the second copper terminal. A heavy copper plate has a surface with spaced opposite first and second sides and a hole formed therethrough substantially equidistantly between the first and second sides. The first and second copper terminals are silver soldered to the surface of the plate at corresponding sides thereof in spaced relation with each other.

Each of the first top plate of the first electrically conductive hammer plate and the second top plate of the second hammer plate has a pair of flanges extending at substantially right angles thereto at spaced opposite side edges thereof.

Each of the first, second, third, fourth, fifth, sixth, seventh and eighth electrically conductive members comprises a solid copper rivet. Insulative means electrically insulates the brush pigtails extending from the top holes of the first wafer, the additional brush pigtails extending from the top holes of the second wafer, the brush pigtails extending from the top holes of the third wafer and the additional brush pigtails extending from the top holes of the fourth wafer to the first and second copper terminals.

BRIEF DESCRIPTION OF THE DRAWINGS

In order that the invention may be readily carried into effect, it will now be described with reference to the accompanying drawings, wherein:

FIG. 1 is a perspective view of a starter-generator brush known in the art;

FIG. 2 is a view, partly in section, taken along the lines II—II; of FIG. 1;

FIG. 4 is a side view of the embodiment of FIG. 3;

FIG. 5 is a view, taken along the lines V—V, of FIG. 4;

FIG. 6 is a view, taken along the lines VI—VI, of FIG. 4;

FIG. 7 is a view, partly in section, taken along the lines VII—VII, of FIG. 5;

DETAILED DESCRIPTION OF PREFERRED EMBODIMENTS

Figure 3:
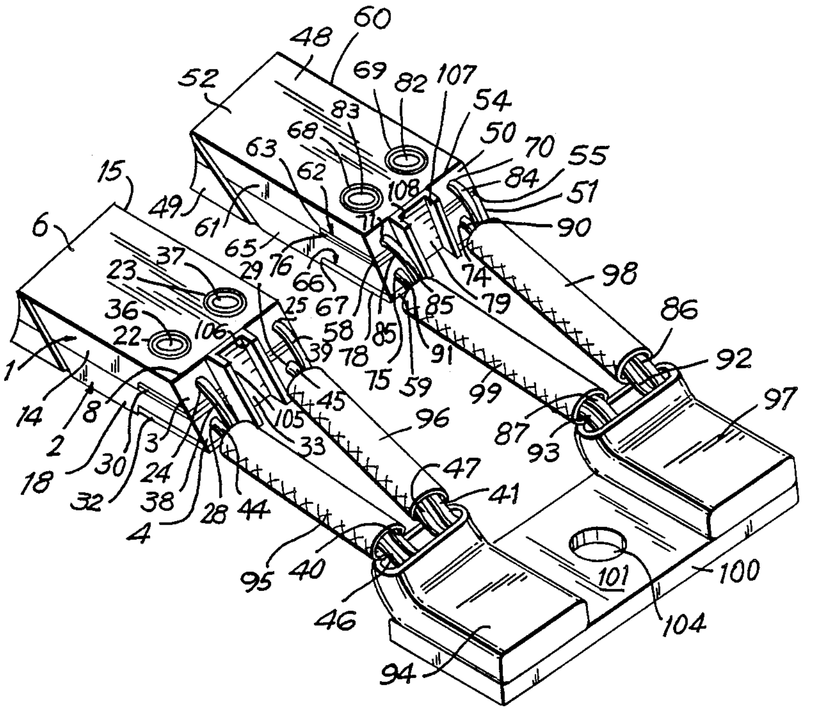
FIG. 3 is perspective view of an embodiment of the starter-generator brush of the invention.

A starter-generator has a rotatable commutator (not shown in the drawings) and a brush contacting the commutator as shown in FIGS. 1, 2 and 3 of pending patent application Ser. No. 695,872 of Thomas D. Paisley, filed Jan. 28, 1985.

A brush of the pending patent application of Thomas D. Paisley is shown in FIGS. 1 and 2 and comprises first and second carbon blocks A1 and A2, respectively. The carbon blocks A1 and A2 have top surfaces A3 and A4, respectively (FIG. 1), spaced from the commutator (shown in FIG. 4). A front surface A6 and A7, respectively, meets the top surface A3 and A4, respectively, at a front edge A8 and A9 of the carbon blocks A1 and A2, respectively (FIG. 1).

The first and second carbon blocks A1 and A2, respectively, have first and second spaced substantially parallel side holes A10 and A11, respectively (FIG. 1), formed therethrough and opening on the front and back surfaces. First and second spaced substantially parallel top holes A13 and A14 are formed in the first block A1 opening on the top surface A3 and extending to the side hole A10. The top holes A13 and A14 of the first carbon block A1 accommodate brush pigtails, as shown in FIG. 1 and hereinafter described. First and second spaced substantially parallel top holes A15 and A16 are formed in the second block A2 on the top surface A4 and extend to the side hole A11. The carbon blocks A1 and A2 have back surfaces (not shown in the FIGS.) meeting their respective top surfaces A3 and A4 at spaced opposite rear edges A17 and A18, respectively. The top holes A15 and A16 of the second carbon block A2 accommodate brush pigtails, as shown in FIG. 1 and hereinafter described.

A first electrically conductive hammer plate has a first back plate (not shown in the FIGS.) on the back surface of the first carbon block A1 and a first top plate A19 (FIG. 1) extending from said first back plate at an acute angle therewith. The first back plate has a hole (not shown in the FIGS.) formed therethrough. A second electrically conductive hammer plate has a second back plate (not shown in the FIGS.) on the back surface of the second carbon block A2 and a second top plate A20 (FIG. 1) extending from said second back plate at an acute angle therewith. The second back plate has a hole (not shown in the FIGS.) formed therethrough.

First and second solid copper rivets A21 and A22 (FIG. 1) extend through the holes of the first back plates and the first and second side holes A10 and A11, respectively, of the first and second carbon blocks A1 and A2, respectively, and affix said back plates to said first and second blocks A1 and A2 with the first and second back plates substantially in juxtaposition with the back surfaces of said carbon blocks.

First brush pigtails A23 and second brush pigtails A24 are accommodated in the first and second top holes A13 and A14, respectively, of the first carbon block A1 (FIG. 1) and have first ends (not shown in the FIGS.) in electrical contact with the first copper rivet A21, provided in any suitable known manner. The first and second brush pigtails A23 and A24, respectively, have spaced opposite free second ends A25 and A26, respectively (FIG. 1). Third brush pigtails A27 and fourth brush pigtails A28 are accommodated in the first and second top holes A15 and A16, respectively, of the second carbon block A2 (FIG. 1) and have first ends (not shown in the FIGS.) in electrical contact with the second copper rivet A22, provided in any suitable known manner. The third and fourth brush pigtails A27 and A28, respectively, have spaced opposite free second ends A29 and A30, respectively (FIG. 1).

A single copper terminal A31 (FIGS. 1 and 2) is electrically connected to the second ends A25, A26, A29 and A30 of the brush pigtails A23, A24, A27 and A28, respectively, in any suitable known manner. A hole A32 (FIGS. 1 and 2) is formed through the essential center of the terminal A31.

The brush of the invention is shown is FIGS. 3 to 10 and comprises first and second substantially juxtaposed carbon wafers 1 and 2, respectively (FIGS. 3, 4 and 7). The carbon wafers 1 and 2 have top surfaces 3 and 4, respectively (FIGS. 3, 4 and 7) spaced from the commutator 5 (FIG. 4). A first surface 6 and 7, respectively, meets the top surface 3 and 4, respectively, at a front edge 8 and 9 of the carbon wafers 1 and 2, respectively (FIG. 4).

The carbon wafers 1 and 2 have back surfaces 10 and 11, respectively, meeting their respective top surfaces 3 and 4 at spaced opposite rear edges 12 and 13, respectively, thereof (FIG. 4). A pair of spaced opposite side surfaces 14 and 15 join corresponding side edges of the front and back surface 6 and 10, respectively, of the carbon wafer 1 and said back surface has a recessed surface 16 extending between said side surfaces and the top surface 3 and a line 17 spaced from and substantially parallel to the rear edge 12 (FIG. 4). A pair of spaced opposite side surfaces 18 and 19 join corresponding side edges of the front and back surfaces 7 and 11, respectively, of the carbon wafer 2 and said back surface has a recessed surface 20 extending between said side surfaces and the top surface 4 and a line 21 spaced from and substantially parallel to the rear edge 13 (FIG. 4).

The first carbon wafer 1 has first and second spaced substantially parallel side holes 22 and 23 (FIGS. 3 and 5) formed therethrough and opening on the front and back surfaces 6 and 10, respectively, and first and second spaced substantially parallel top holes 24 and 25 (FIGS. 3, 5 and 7) formed in said first wafer opening on the top surface 3 and extending to said first and second side holes, respectively. The top holes 24 and 25 of the first carbon wafer 1 accommodate brush pigtails, as shown in FIGS. 3 and 5 and hereinafter described.

Figure 10:
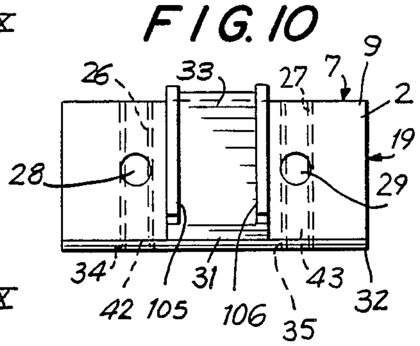
FIG. 10 is a view, taken along the lines X—X, of FIG. 8.
Figure 9:
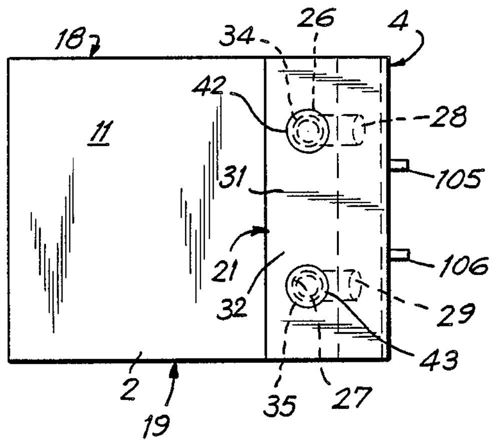
FIG. 9 is a view, taken along the lines IX—IX, of FIG. 8.

The second carbon wafer 2 has first and second spaced substantially parallel side holes 26 and 27 (FIGS. 6, 9 and 10) formed therethrough and opening on the front and back surfaces 7 and 11, respectively, and first and second spaced substantially parallel top holes 28 and 29 (FIGS. 7, 9 and 10) formed in said second wafer opening on the top surface 4 and extending to said first and second side holes, respectively, as shown in FIGS. 9 and 10. The top holes 28 and 29 of the second carbon wafer 2 accommodate brush pigtails, as shown in FIGS. 3 and 7 and hereinafter described.

Figure 8:
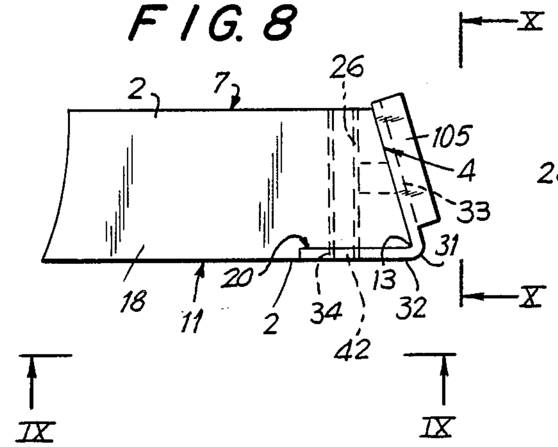
FIG. 8 is a side view, on an enlarged scale, of an embodiment of part of a carbon wafer of the embodiment of FIGS. 3 to 7.

A first copper plate 30 is provided on the recessed surface 16 of the first carbon wafer 1 (FIGS. 3, 4 and 7) and has a pair of spaced holes (not shown in the FIGS.) formed therethrough. A first electrically conductive hammer plate 31 (FIGS. 8, 9 and 10) has a first copper back plate 32 (FIGS. 3 and 6 to 10) on the recessed surface 20 of the second carbon wafer 2 (FIGS. 4 and 8) and a first top plate 33 (FIGS. 5 to 8 and 10) extending from said first back plate at an acute angle therewith, as shown in FIG. 8. The first back plate 32 has a pair of spaced holes 34 and 35 (FIGS. 9 and 10) formed therethrough.

First and second solid copper rivets 36 and 37 (FIGS. 3 and 5) extend throgh the holes of the first copper plate 30 and the first and second side holes 22 and 23, respectively, of the first carbon wafer 1 and affix said first copper plate to said first wafer with said first copper plate substantially in juxtaposition with the back surface 10 of said first wafer, as shown in FIGS. 3 and 4.

First brush pigtails 38 and second brush pigtails 39 are accommodated in the first and second top holes 24 and 25, respectively, of the first wafer 1 (FIGS. 3, 5 and 7) and have first ends (not shown in the FIGS.) in electrical contact with the first and second copper rivets 36 and 37, respectively, provided in any suitable known manner. The first and second brush pigtails 38 and 39, respectively, have spaced opposite free second ends 40 and 41, respectively (FIGS. 3 and 5).

Third and fourth solid copper rivets 42 and 43 (FIGS. 6, 9 and 10) extend through the holes 34 and 35 of the first back plate 32 and the first and second side holes 26 and 27, respectively, of the second carbon wafer 2 and affix said first back plate to said second wafer with said first back plate substantially in juxtaposition with the back surface 11 of said second wafer, as shown in FIGS. 4, 8 and 10, and the first top plate 33 substantially juxtaposed with the top surfaces 3 and 4, respectively, of the first and second carbon wafers 1 and 2, respectively, of the first and second carbon wafers 1 and 2, respectively, as shown in FIGS. 4 and 7.

Third brush pigtails 44 and fourth brush pigtails 45 are accommodated in the first and second top holes 28 and 29, respectively, of the second wafer 2 (FIGS. 3, 6 and 7) and have first ends (not shown in the FIGS.) in electrical contact with the third and fourth copper rivets 42 and 43, respectively, provided in any suitable known manner. The third and fourth brush pigtails 44 and 45, respectively, have spaced opposite free second ends 46 and 47, respectively (FIGS. 3 and 6).

The brush of the invention as shown in FIGS. 3 and 5 to 7, further comprises third and fourth substantially juxtaposed carbon wafers 48 and 49, respectively (FIGS. 3 and 7). The third carbon wafer 48 is identical to the first carbon wafer 1 and the fourth carbon wafer 49 is identical to the second carbon wafer 2. The carbon wafers 48 and 49 have top surfaces 50 and 51, respectively (FIGS. 3 and 7) spaced from the commutator 5 (FIG. 4). A first surface 52 and 53, respectively, meets the top surface 50 and 51, respectively, at a front edge 54 and 55 of the carbon wafers 48 and 49, respectively (FIG. 3).

The carbon wafers 48 and 49 have back surfaces 56 and 57, respectively, meeting their respective top surfaces 50 and 51 at spaced opposite rear edges 58 and 59, respectively, thereof (FIG. 7). A pair of spaced opposite side surfaces 60 and 61 join corresponding side edges of the front and back surfaces 52 and 56, respectively, of the carbon wafer 48 (FIGS. 3 and 5) and said back surface has a recessed surface 62 extending between said side surfaces and the top surface 50 and a line 63 spaced from and substantially parallel to the rear edge 58 (FIG. 3). A pair of spaced opposite side surfaces 64 and 65 join corresponding side edges of the front and back surfaces 53 and 57, respectively, of the carbon wafer 49 (FIG. 6) and said back surface has a recessed surface 66 extending between said side surfaces and the top surface 51 and a line 67 spaced from and substantially parallel to the rear edge 59 (FIG. 3).

The third carbon wafer 48 has first and second spaced substantially parallel side holes 68 and 69 (FIGS. 3 and 5) formed therethrough and opening on the front and back surfaces 52 and 56, respectively, and first and second spaced substantially parallel top holes 70 and 71 (FIGS. 3, 5 and 7) formed in said third wafer opening on the top surface 50 and extending to said first and second side holes, respectively. The top holes 70 and 71 of the third carbon wafer 48 accommodate brush pigtails, as shown in FIGS. 3 and 5 and hereinafter described.

The fourth carbon wafer 49 has first and second spaced substantially parallel side holes 72 and 73 (FIG. 6) formed therethrough and opening on the front and back surfaces 53 and 57, respectively, and first and second spaced substantially parallel top holes 74 and 75 (FIG. 7) formed in said fourth wafer opening on the top surface 51 and extending to said first and second side holes, respectively, as shown for the second carbon wafer 2 in FIGS. 9 and 10. The top holes 74 and 75 of the fourth carbon wafer 49 accommodate brush pigtails, as shown in FIGS. 3 and 7 and hereinafter described.

A second copper plate 76 is provided on the recessed surface 62 of the third carbon wafer 48 (FIGS. 3 and 7) and has a pair of spaced holes (not shown in the FIGS.) formed therethrough. A second electrically conductive hammer plate 77 (FIG. 6) has a second copper back plate 78 (FIGS. 3, 6 and 7) on the recessed surface 66 of the fourth carbon wafer 49 (FIGS. 3 and 6) and a second top plate 79 (FIGS. 3 and 5 to 7) extending from said second back plate at an acute angle therewith, as shown for the first hammer plate in FIG. 8. The second back plate 78 has a pair of spaced holes 80 and 81 (not shown in the FIGS., but identical to the holes 34 and 35 in FIGS. 9 and 10) formed therethrough.

Fifth and sixth solid copper rivets 82 and 83 (FIGS. 3 and 5) extend through the holes of the second copper plate 76 and the first and second side holes 68 and 69, respectively, of the third carbon wafer 48 and affix said second copper plate to said third wafer with said second copper plate substantially in juxtaposition with the back surface 56 of said third wafer, as shown in FIGS. 3 and 4.

Fifth brush pigtails 84 and sixth brush pigtails 85 are accommodated in the first and second top holes 70 and 71, respectively, of the third wafer 48 (FIGS. 3, 5 and 7) and have first ends (not shown in the FIGS.) in electrical contact with the fifth and sixth copper rivets 82 and 83, respectively, provided in any suitable known manner. The fifth and sixth brush pigtails 84 and 85, respectively, have spaced opposite free second ends 86 and 87, respectively (FIGS. 3 and 5).

Seventh and eight solid copper rivets 88 and 89 (FIG. 6) extend through the holes 81 and 82 of the second back plate 78 and the first and second side holes 72 and 73, respectively, of the fourth carbon wafer 49 and affix said second back plate to said fourth wafer with said second back plate substantially in juxtaposition with the back surface 57 of said fourth wafer, as shown in FIG. 3, and the second top plate 79 substantially juxtaposed with the top surfaces 50 and 51, respectively, of the third and fourth carbon wafers 48 and 49, respectively, as shown in FIG. 3.

Seventh brush pigtails 90 and eighth brush pigtails 91 are accommodated in the first and second top holes 74 and 75, respectively, of the fourth wafer 49 (FIGS. 3, 6 and 7) and have first ends (not shown in the FIGS.) in electrical contact with the seventh and eighth copper rivets 88 and 89, respectively, provided in any suitable known manner. The seventh and eighth brush pigtails 90 and 91, respectively, have spaced opposite free second ends 92 and 93, respectively (FIGS. 3 and 6).

A first copper terminal 94 (FIGS. 3 and 4 to 6) is electrically connected to the second ends 40, 41, 46 and 47 of the brush pigtails 38, 39, 44 and 45, respectively, in any suitable known manner for conducting maximum current from the carbon wafers 1 and 2. The pigtails 38, 39, 44 and 45 are preferably silver soldered in the first copper terminal 94. The pigtails 38 and 44 are electrically insulated in any suitable known manner such as, for example, a sleeve 95 of electrically insulative material of any suitable type (FIGS. 3 to 6). The pigtails 39 and 45 are electrically insulated in any suitable known manner such as, for example, a sleeve 96 of electrically insulative material of any suitable type (FIGS. 3, 5 and 6).

A second copper terminal 97 (FIGS. 3, 5 and 6) is electrically connected to the second ends 86, 87, 92 and 93 of the brush pigtails 84, 85, 90 and 91, respectively, in any suitable known manner, for conducting maximum current from the carbon wafers 48 and 49. The pigtails 84, 85, 90 and 91 are preferably silver soldered in the second copper terminal 97. The pigtails 84 and 90 are electrically insulated in any suitable known manner such as, for example, a sleeve 98 of electrically insulative material of any suitable type (FIGS. 3, 5 and 6). The pigtails 85 and 91 are electrically insulated in any suitable known manner such as, for example, a sleeve 99 of electrically insulative material of any suitable type (FIGS. 3, 5 and 6).

A heavy copper plate 100 (FIGS. 3 to 6) has a surface 101 (FIGS. 3 and 5) with spaced opposite first and second sides 102 and 103 (FIG. 5) and a hole 104 (FIGS. 3, 5 and 6) formed therethrough substantially equidistantly between said first and second sides. The first and second copper terminals 94 and 97, respectively, are silver soldered to the surface 101 of the plate 100 at the sides 102 and 103 thereof, respectively, in spaced relation with each other, as shown in FIGS. 3, 5 and 6.

The first top plate 33 of the first hammer plate 31 has a pair of flanges 105 and 106 extending at substantially right angles thereto at spaced opposite side edges thereof (FIGS. 3, 5 to 7, 9 and 10). The second top plate 79 of the second hammer 77 has a pair of flanges 107 and 108 extending at substantially right angles thereto at spaced opposite side edges thereof (FIGS. 3 and 5 to 7). The flanges 105, 106, 107 and 108 structurally strengthen the top plates 33 and 79.

While the invention has been described by means of a specific example and in a specific embodiment, I do not wish to be limited thereto, for obvious modifications will occur to those skilled in the art without departing from the spirit and scope of the invention.

I claim:

1. A starter-generator having a rotatable commutator and a brush contacting the commutator, said brush comprising first and second substantially juxtaposed carbon wafers each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, each of said first and second carbon wafers having first and second spaced substantially parallel side holes formed therethrough and opening on said front and back surfaces and first and second spaced substantially parallel top holes formed in said wafer and opening on said top surface and extending to said first and second spaced substantially parallel side holes, respectively, of the respective wafer, said top holes accommodating brush pigtails;

a first electrically conductive plate on the back surface of said first carbon wafer, said first electrically conductive plate having a first pair of spaced holes formed therethrough;

a first electrically conductive hammer plate having a first electrically conductive back plate on the back surface of said second carbon wafer and a first top plate extending from said first back plate at an acute angle therewith, said first back plate having a first pair of spaced holes formed therethrough;

first and second electrically conductive members extending through said first pair of spaced holes of said first electrically conductive plate and said first and second spaced substantially parallel side holes of said first carbon wafer and affixing said first electrically conductive plate to said first carbon wafer with said first electrically conductive plate substantially in juxtaposition with said back surface of said first carbon wafer;

brush pigtails accommodated in said first and second top holes of said first carbon wafer and having a first end in electrical contact with said first and second electrically conductive members, respectively, and a spaced opposite free second end;

third and fourth electrically conductive members extending through said first pair of spaced holes of said first back plate and said first and second spaced substantially parallel side holes of said second carbon wafer and affixing said first back plate to said second carbon wafer with said first back plate substantially in juxtaposition with said back surface of said second carbon wafer and said first top plate substantially juxtaposed with said top surface of each of said first and second carbon wafers; and additional brush pigtails accommodated in said first and second spaced substantially parallel top holes of said second carbon wafer and having a first end in electrical contact with said third and fourth electrically conductive members, respectively, and a spaced opposite free second end.

2. A starter-generator as claimed in claim 1, wherein the back surface of each of said first and second carbon wafers has a recessed surface extending between said side surfaces and said top surface and a line spaced from and substantially parallel to said rear edge, said first electrically conductive plate being on the recessed surface of said first carbon wafer, and said first electrically conductive hammer plate having a first electrically conductive back plate on the recessed surface of said second carbon wafer.

3. A starter-generator as claimed in claim 1, further comprising a first electrically conductive terminal at the second ends of said brush pigtails and additional brush pigtails for conducting maximum, current from said brush, said first electrically conductive terminal accommodating said brush pigtails and additional brush pigtails, said brush pigtails and additional brush pigtails being silver soldered in said first electrically conductive terminal.

4. A starter-generator as claimed in claim 1, wherein said first top plate of said first electrically conductive hammer plate has a pair of flanges extending at substantially right angles thereto at spaced opposite side edges thereof.

5. A starter-generator as claimed in claim 1, wherein each of said first, second, third and fourth electrically conductive members comprises a solid copper rivet.

6. A starter-generator as claimed in claim 3, wherein said brush further comprises insulative means for electrically insulating the brush pigtails extending from the top holes of said first carbon wafer and the additional brush pigtails extending from the top holes of said second carbon wafer to said first electrically conductive terminal.

7. A starter-generator as claimed in claim 1, wherein each of said first electrically conductive plate and the electrically conductive back plate of said first electrically conductive hammer plate comprises copper.

8. A starter-generator as claimed in claim 3, wherein said first electrically conductive terminal comprises copper.

9. A starter-generator having a rotatable commutator and a brush contacting the commutator, said brush comprising first and second substantially juxtaposed carbon wafers each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, the back surface of each of said first and second wafers having a recessed surface extending between said side surfaces and said top surface and a line spaced from and substantially parallel to said rear edge, each of said first and second wafers having first and second spaced substantially parallel side holes formed therethrough and opening on said front and back surfaces and first and second spaced substantially parallel top holes formed in said wafer and opening on said top surface and extending to said first and second side holes, respectively, of the respectively wafer, said top holes accommodating brush pigtails;

a first copper plate on the recessed surface of said first carbon wafer, said first copper plate having a first pair of spaced holes formed therethrough;

a first electrically conductive hammer plate having a first copper back plate on the recessed surface of said second carbon wafer and a first top plate extending from said first back plate at an acute angle therewith, said first back plate having a first pair of spaced holes formed therethrough;

first and second electrically conductive members extending through said first pair of spaced holes of said first copper plate and said first and second side holes of said first carbon wafer and affixing said first copper plate to said first carbon wafer with said first copper plate substantially in juxtaposition with said back surface of said first carbon wafer;

first brush pigtails accommodated in said first and second top holes of said first carbon wafer and having a first end in electrical contact with said first and second electrically conductive members, respectively, and a spaced opposite free second end;

third and fourth electrically conductive members extending through said first pair of spaced holes of said first back plate and said first and second side holes of said second carbon wafer and affixing said first back plate to said second carbon wafer with said first plate substantially in juxtaposition with said back surface of said second carbon wafer and said first top plate substantially juxtaposed with said top surface of each of said first and second wafers;

second brush pigtails accommodated in said first and second top holes of said second wafer and having a first end in electrical contact with said third and fourth electrically conductive members, respectively, and a spaced opposite free second end;

a first copper terminal at the second ends of said first brush pigtails; and third brush pigtails for conducting maximum current from said brush, said first copper terminal accommodating said first brush pigtails and second brush pigtails, said first brush pigtails and second brush pigtails being silver soldered in said first copper terminal;

third and fourth substantially juxtaposed carbon wafers, each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, the back surface of each of said third and fourth carbon wafers having a recessed surface extending between said side surfaces and said top surface and a line spaced from and substantially parallel to said rear edge, each of said third and fourth carbon wafers having first and second spaced substantially parallel side holes formed therethrough and opening on said front and back surfaces and first and second spaced substantially parallel top holes formed in said wafer and opening on said top surface and extending to said first and second side holes, respectively, of the respective third and fourth carbon wafer;

a second copper plate on the recessed surface of said third carbon wafer, said second copper plate having a second pair of spaced holes formed therethrough;

a second electrically conductive hammer plate having a second copper plate on the recessed surface of said fourth carbon wafer and a second top plate extending from said second back plate at an acute angle therewith, said second back plate having a second pair of spaced holes formed therethrough;

fifth and sixth electrically conductive members extending through said second pair of spaced holes of said second copper plate and said first and second side holes of said third carbon wafer and affixing said second copper plate to said third carbon wafer with said second copper plate substantially in juxtaposition with said back surface of said third carbon wafer;

fourth pigtails accommodated in said first and second top holes of said third carbon wafer and having a first end in electrical contact with said fifth and sixth electrically conductive members, respectively, and a spaced opposite free second end;

seventh and eighth electrically conductive members extending through said second pair of spaced holes in said second back plate and said first and second side holes of said fourth carbon wafer and affixing said second back plate to said fourth carbon wafer with said second back plate substantially in juxtaposition with said back surface of said fourth carbon wafer and said second top plate substantially juxtaposed with said top surface of each of said third and fourth carbon wafers; and fifth brush pigtails accommodated in said first and second top holes of said fourth carbon wafer and having a first end in electrical contact with said seventh and eighth conductive members, respectively, and a spaced opposite free second end.

10. A starter-generator as claimed in claim 9, further comprising a second copper terminal at the second ends of said first and second brush pigtails.

11. A starter-generator as claimed in claim 9, wherein said second top plate of said second hammer plate has a pair of flanges extending at substantially right angles thereto at spaced opposite side edges thereof.

12. A starter-generator as claimed in claim 9, wherein each of said fifth, sixth, seventh and eighth electrically conductive members comprises a solid copper rivet.

13. A starter-generator as claimed in claim 10, wherein said brush further comprises insulative means for electrically insulating the fourth brush pigtails extending from the top holes of said third wafer and the fifth brush pigtails extending from the top holes of said fourth carbon wafer to said second copper terminal.

14. A starter-generator as claimed in claim 10, further comprising a heavy copper plate having a surface with spaced opposite first and second sides and a hole formed therethrough substantially equidistantly between said first and second sides, said first and second copper terminals being silver soldered to said surface of said plate at corresponding sides thereof in spaced relation with each other.

15. A starter-generator having a rotatable commutator and a brushing contacting the commutator, said brush comprising first and second substantially juxtaposed carbon wafers each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, the back surface of each of said first and second wafers having a recessed surface extending between said side surfaces and said top surface and a line spaced from and substantially parallel to said rear edge, each of said first and second wafers having first and second spaced substantially parallel side holes formed therethrough and opening on said front and back surfaces and first and second spaced substantially parallel top holes formed in said wafers and opening on said top surface and extending to said first and second side holes, respectively, of each of said wafers, said top holes accommodating brush pigtails;

a first copper plate on the recessed surface of said first carbon wafer, said first copper plate having a first pair of spaced holes formed therethrough;

a first electrically conductive hammer plate having a first copper back plate on the recessed surface of said second carbon wafer and a first top plate extending from said first back plate at an acute angle therewith, said first back plate having a first pair of spaced holes formed therethrough;

first and second electrically conductive members extending through said first pair of spaced holes of said first copper plate and said first and second side holes of said first carbon wafer and affixing said first copper plate to said first wafer with said first copper plate substantially in juxtaposition with said back surface of said first wafer;

first brush pigtails accommodated in said first and second top holes of said first wafer and having a first end in electrical contact with said first and second electrically conductive members, respectively, and a spaced opposite free second end;

third and fourth electrically conductive members extending through said first pair of spaced holes of said first back plate and said first and second side holes of said second carbon wafer and affixing said first back plate to said second wafer with said first back plate substantially in juxtaposition with said back surface of said second wafer and said first top plate substantially juxtaposed with said top surface of each of said first and second wafers;

second brush pigtails accommodated in said first and second top holes of said second wafer and having a first end in electrical contact with said third and fourth electrically conductive members, respectively, and a spaced opposite free second end;

a first copper terminal at the second ends of said first brush pigtails and second brush pigtails for conducting maximum current from said brush, said first copper terminal accommodating said first brush pigtails and second brush pigtails, said first brush pigtails and second brush pigtails being silver soldered in said first copper terminal;

third and fourth substantially juxtaposed carbon wafers, each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, the back surface of each of said third and fourth wafers having a recessed surface extending between said side surfaces and said top surface and a line spaced from and substantially parallel to said rear edge, each of said third and fourth wafers having first and second spaced substantially parallel side holes formed therethrough and opening on said front and back surfaces and first and second substantially parallel top holes formed in said wafer and opening on said top surface and extending to said first and second side holes, respectively, of the respective third and fourth wafer, said top holes accommodating brush pigtails;

a second copper plate on the recessed surface of said third carbon wafer, said second copper plate having a second pair of spaced holes formed therethrough;

a second electrically conductive hammer plate having a second copper back plate on the recessed surface of said fourth carbon wafer and a second top plate extending from said second back plate at an acute angle therewith, said second back plate having a second pair of spaced holes formed therethrough;

fifth and sixth electrically conductive members extending through said second pair of spaced holes of said second copper plate and said first and second side holes of said third carbon wafer and affixing said second copper plate to said third wafer with said second copper plate substantially in juxtaposition with said back surface of said third wafer;

third brush pigtails accommodated in said first and second top holes of said third wafer and having a first end in electrical contact with said fifth and sixth electrically conductive members, respectively, and a spaced opposite free second end;

seventh and eighth electrically conductive members extending through said second pair of spaced holes in said second back plate and said first and second side holes of said fourth carbon wafer and affixing said second back plate to said fourth wafer with said second back plate substantially in juxtaposition with said back surface of said fourth wafer and said second top plate substantially juxtaposed with said top surface of each of said third and fourth wafers;

fourth brush pigtails accommodated in said first and second top holes of said fourth wafer and having a first end in electrical contact with said seventh and eighth conductive members, respectively, and a spaced opposite free second end;

a second copper terminal at the second ends of said third brush pigtails and fourth brush pigtails for conducting maximum current from said brush, said second copper terminal accommodating said third brush pigtails and fourth brush pigtails, said third brush pigtails and fourth brush pigtails being silver soldered in said second copper terminal; and a heavy copper plate having a surface with spaced opposite first and second sides and a hole formed therethrough substantially quidistantly between said first and second sides, said first and second copper terminals being silver soldered to said surface of said plate at corresponding sides thereof in spaced relation with each other.

16. A starter-generator as claimed in claim 15, wherein each of said first top plate of said first electrically conductive hammer plate and said second top plate of said second electrically conductive hammer plate has a pair of flanges extending at substantially right angles thereto at spaced opposite side edges thereof.

17. A starter-generator as claimed in claim 15, wherein each of said first, second, third, fourth, fifth, sixth, seventh and eighth electrically conductive members comprises a solid copper rivet, and further comprising insulative means for electrically insulating the first brush pigtails extending from the top holes of said first wafer, the second brush pigtails extending from the top holes of said second wafer, the third brush pigtails extending from the top holes of said third wafer and the fourth brush pigtails extending from the top holes of said fourth wafer to said first and second copper terminals.

18. A dynamoelectric machine having a rotatable commutator and a brush contacting the commutator, said brush comprising first and second substantially juxtaposed carbon wafers each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, each of said first and second wafers having first and second spaced substantially parallel side holes formed therethrough and opening on said front and back surfaces and first and second spaced substantially parallel top holes formed in said wafer and opening on said top surface and extending to said first and second side holes, respectively, of the respective wafer, said top holes accommodating brush pigtails;

a first copper plate on the back surface of said first carbon wafer, said first carbon plate having a first pair of spaced holes formed therethrough;

a first electrically conductive hammer plate having a first copper back plate on the back surface of said second carbon wafer and a first top plate extending from said first back plate at an acute angle therewith, said first back plate having a first pair of spaced holes formed therethrough;

first and second electrically conductive members extending thorugh said first pair of spaced holes of said first copper plate and said first and second side holes of said first carbon wafer and affixing said first copper plate to said first wafer with said first copper plate substantially in juxtaposition with said back surface of said first wafer;

first brush pigtails accommodated in said first and second top holes of said first wafer and having a first end in electrical contact with said first and second electrically conductive members, respectively, and a spaced opposite free second end;

third and fourth electrically conductive members extending through said first pair of spaced holes of said first back plate and said first and second side holes of said second carbon wafer and affixing said first back plate to said second wafer with said first back plate substantially in juxtaposition with said back surface of said second wafer and said first top plate substantially juxtaposed with said top surface of each of said first and second wafers;

second brush pigtails accommodated in said first and second top holes of said second wafer and having a first end in electrical contact with said first and second electrically conductive members, respectively, and a spaced opposite free second end;

third and fourth substantially juxtaposed carbon wafers, each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, each of said third and fourth wafers having first and second spaced substantially parallel side holes formed therethrough and opening on said front and back surfaces and first and second spaced substantially parallel top holes formed in said wafer and opening on said top surface and extending to said first and second side holes, respectively, of the respective third and fourth wafer, said top holes accommodating said brush pigtails;

a second copper plate on the back surface of said third carbon wafer, said second copper plate having a second pair of spaced holes formed therethrough;

a second electrically conductive hammer plate having a second copper plate on the back surface of said fourth carbon wafer and a second top plate extending from said second back plate at an acute angle therewith, said second back plate having a second pair of spaced holes formed therethrough;

fifth and sixth electrically conductive members extending through said second pair of spaced holes of said second copper plate and said first and second side holes of said third carbon wafer and affixing said second copper plate to said third wafer with said second copper plate substantially in juxtaposition with said back surface of said third wafer;

third brush pigtails accommodated in said first and second top holes of said third wafer and having a first end in electrical contact with said fifth and sixth electrically conductive members, respectively, and a spaced opposite free second end;

seventh and eighth electrically conductive members extending through said second pair of spaced holes in said second back plate and said first and second side holes of said fourth carbon wafer and affixing said second back plate to said fourth wafer and said second back plate substantially in juxtaposition with said back surface of said fourth wafer and said second top plate substantially juxtaposed with said top surface of each of said third and fourth wafers; and fourth brush pigtails accommodated in said first and second top holes of said fourth wafer and having a first end in electrical contact with said seventh and eighth conductive members, respectively, and a spaced opposite free second end.

19. A dynamoelectric machine having a rotatable commutator and a brush contacting the commutator, said brush comprising first and second substantially juxtaposed carbon wafers each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, each of said first and second wafers having first and second spaced substantially parallel side holes formed therethrough and opening on said front and back surfaces and first and second spaced substantially parallel top holes formed in said wafer and opening on said top surface and extending to said first and second side holes, respectively, of the respective wafer, said top holes accommodating brush pigtails;

a first electrically conductive plate on the back surface of said first carbon wafer, said first electrically conductive plate having a first pair of spaced holes formed therethrough;

a first electrically conductive hammer plate having a first electrically conductive back plate on the back surface of said second carbon wafer and a first top plate extending from said first back plate at an acute angle therewith, said first back plate having a first pair of spaced holes formed therethrough;

first and second electrically conductive members extending through said first pair of spaced holes of said first electrically conductive plate and said first and second side holes of said first carbon wafer and affixing said first electrically conductive plate to said first wafer with said first electrically conductive plate substantially in juxtaposition with said back surface of said first wafer;

first pigtails accommodated in said first and second top holes of said first wafer and having a first end in electrical contact with said first and second electrically conductive members, respectively, and a spaced opposite free second end;

third and fourth electrically conductive members extending through said first pair of spaced holes of said first back plate and said first and second side holes of said second carbon wafer and affixing said first back plate to said second wafer with said first back plate substantially in juxtaposition with said back surface of said second wafer and said first top plate substantially juxtaposed with said top surface of each of said first and second wafers;

second brush pigtails accommodated in said first and second top holes of said second wafer and having a first end in electrical contact with said third and fourth electrically conductive members, respectively, and a spaced opposite free second end;

third and fourth substantially juxtaposed carbon wafers, each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, each of said third and fourth wafers having first and second spaced substantially parallel side holes formed therethrough and opening on said front and back surfaces and first and second spaced substantially parallel top holes formed in said wafer and opening on said top surface and extending to said first and second side holes, respectively, of the respective third and fourth wafer, said top holes accommodating brush pigtails;

a second electrically conductive plate on the back surface of said third carbon wafer, said second electrically conductive plate having second a pair of spaced holes formed therethrough;

a second electrically conductive hammer plate having a second electrically conductive back plate on the back surface of said fourth carbon wafer and a second top plate extending from said second back plate at an acute angle therewith, said second back plate having a second pair of spaced holes formed therethrough;

fifth and sixth electrically conductive members extending through said second pair of spaced holes of said second electrically conductive plate and said first and second side holes of said third carbon wafer and affixing said second electrically conductive plate to said third wafer with said second electrically conductive plate substantially in juxtaposition with said back surface of said third wafer;

third pigtails accommodated in said first and second top holes of said third wafer and having a first end in electrical contact with said fifth and sixth electrically conductive members, respectively, and a spaced opposite free second end;

seventh and eighth electrically conductive members extending through said second pair of spaced holes in said second back plate and said first and second side holes of said fourth carbon wafer and affixing said second back plate to said fourth wafer with said second back plate substantially in juxtaposition with said back surface of said fourth wafer and said second top plate substantially juxtaposed with said top surface of each of said third and fourth wafers; and fourth brush pigtails accommodated in said first and second top holes of said fourth wafer and having a first end in electrical contact with said seventh and eighth conductive members, respectively, and a spaced opposite free second end.

20. A dynamoelectric machine as claimed in claim 19, wherein the back surface of each of said first and second wafers has a recessed surface extending between said side surfaces and said top surface and a line spaced from and substantially parallel to said rear edge, said first electrically conductive plate being on the recessed surface of said first carbon wafer, the first electrically conductive back plate of said first electrically conductive hammer plate being on the recessed surface of said second carbon wafer, the back surface of each of said third and fourth wafers having a recessed surface extending between said side surfaces and said top surface and a line spaced from and substantially parallel to said rear edge, said second electrically conductive plate being on the recessed surface of said third carbon wafer, and the second electrically conductive back plate of said second electrically conductive hammer plate being on the recessed surface of said fourth carbon wafer, and further comprising a first electrically conductive terminal at the second ends of said brush pigtails, and fifth and sixth brush pigtails for conducting maximum current from said brush, said first electrically conductive terminal accommodating said fifth brush pigtails and sixth brush pigtails, said fifth brush pigtails and sixth brush pigtails being silver soldered in said first electrically conductive terminal.

21. A dynamoelectric machine as claimed in claim 20, further comprising a second electrically conductive terminal at the second ends of said seventh brush pigtails and eighth brush pigtails for conducting maximum current from said brush, said second electrically conductive terminal accommodating said seventh brush pigtails and eighth brush pigtails, said seventh brush pigtails and eighth brush pigtails being silver soldered in said second electrically conductive terminal.

22. A dynamoelectric machine as claimed in claim 21, further comprising a heavy electrically conductive plate having a surface with spaced opposite first and second sides and a hole formed therethrough substantially equidistant between said first and second sides, said first and second electrically conductive terminals being silver soldered to said surface of said plate at corresponding sides thereof in spaced relation with each other.

23. A dynamoelectric machine having a rotatable commutator and a brush contacting the commutator, said brush comprising first and second substantially juxtaposed carbon wafers each having a top surface spaced from said commutator, a front surface meeting said top surface at a front edge thereof, a back surfce meeting said top surface at a spaced opposite rear edge thereof and a pair of spaced opposite side surfaces joining corresponding side edges of said front and back surfaces, the back surface of each of said first and second wafers having a recessed surface extending between said side surfaces and said top surface and a line spaced from and substantially parallel to said rear edge, each of said first and second wafers having first and second spaced substantially parallel side holes formed therethrough and opening on said front and back surfaces and first and second spaced substantially parallel top holes formed in said wafer and opening on said top surface and extending to said first and second side holes, rsepectively, of the respective wafer, said top holes accommodating brush pigtails;

a first electrically conductive plate on the recessed surface of said first carbon wafer, said first electrically conductive plate having a first pair of spaced holes formed therethrough;

a first electrically conductive hammer plate having a first electrically conductive back plate on the recessed surface of said second carbon wafer and a first top plate extending from said first back plate at an acute angle therewith, said first back plate having a first pair of spaced holes formed therethrough;

first and second electrically conductive members extending through said first pair of spaced holes of said first electrically conductive plate and said first and second side holes of said first carbon wafer and affixing said first electrically conductive plate to said first wafer with said first electrically conductive plate substantially in juxtaposition with said back surface of said first wafer;

first brush pigtails accommodated in said first and second top holes of said first wafer and having a first end in electrical contact with said first and second electrically conductive members, respectively, and a spaced opposite free second end;

third and fourth electrically conductive members extending through said first pair of spaced holes of said first back plate and said first and second side holes of said second carbon wafer and affixing said first back plate to said second wafer with said first back plate substantially in juxtaposition with said back surface of said second wafer and said first top plate substantially juxtaposed with said top surface of each of said first and second wafers;

second brush pigtails accommodated in said first and second top holes of said second wafer and having a first end in electrical contact with said third and fourth electrically conductive members, respectively, and a spaced opposite free second end;

a first electrically conductive terminal at the second ends of said first brush pigtails and second brush pigtails for conducting maximum current from said brush, said first electrically conductive terminal accommodating said first brush pigtails and second brush pigtails, said first brush pigtails and second brush pigtails being silver soldered in said first electrically conductive terminal;

third and fourth substantially juxtaposed carbon wafers, each having a top surface spaced from said commutator, a front surface meeting said top surface at a front edge thereof, a back surface meeting said top surface at a spaced opposite rear edge thereof and a pair of spaced opposite side surfaces joining corresponding side edges of said front and back surfaces, the back surface of each of said third and fourth wafers having a recessed surface extending between said side surfaces and said top surface and a line spaced from and substantially parallel to said rear edge, each of said third and fourth wafers having first and second spaced substantially parallel side holes formed therethrough and opening on said front and back surfaces and first and second substantially parallel top holes formed in said wafer and opening on said top surface and extending to said first and second side holes, respectively, of the respective third and fourth wafer, said top holes accommodating said brush pigtails;

a second electrically conductive plate on the recessed surface of said third carbon wafer, said second electrically conductive plate having a second pair of spaced holes formed therethrough;

a second electrically conductive hammer plate having a second electrically conductive back plate on the recessed surface of said fourth carbon wafer and a second top plate extending from said second back plate at an acute angle therewith, said second back plate having a second pair of spaced holes formed therethrough;

fifth and sixth electrically conductive members extending through said second pair of spaced holes of said second electrically conductive plate and said first and second side holes of said third carbon wafer and affixing said second electrically conductive plate to said third wafer with said second electrically conductive plate substantially in juxtaposition with said back surface of said third wafer;

third brush pigtails accommodated in said first and second top holes of said third wafer and having a first end in electrical contact with said fifth and sixth electrically conductive members, respectively, and a spaced opposite free second end;

seventh and eighth electrically conductive members extending through said second pair of spaced holes in said second back plate and said first and second side holes of said fourth carbon wafer and affixing said second back plate to said fourth wafer with said second back plate substantially in juxtaposition with said back surface of said fourth wafer and said second top plate substantially juxtaposed with said top surface of each of said third and fourth wafers;

fourth brush pigtails accommodated in said first and second top holes of said fourth wafer and having a first end in electrical contact with said seventh and eighth conductive members, respectively, and a spaced opposite free second end;

a second electrically conductive terminal at the second ends of said third brush pitails and fourth brush pigtails for conducting maximum current from said brush said second electrically conductive terminal accommodating said third brush pigtails and fourth brush pigtails being silver soldered in said second electrically conductive terminal; and an electrically conductive plate having a surface with spaced opposite first and second sides and a hole formed therethrough substantially equidistantly between said first and second sides, said first and second electrically conductive terminals being silver soldered to said surface of said plate at corresponding sides thereof in spaced relation with each other.

* * * * *